US007058745B2

(12) United States Patent
Sakamoto

(10) Patent No.: US 7,058,745 B2
(45) Date of Patent: *Jun. 6, 2006

(54) DATA TERMINAL EQUIPMENT

(75) Inventor: Kiyomi Sakamoto, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/885,736

(22) Filed: Jul. 8, 2004

(65) Prior Publication Data

US 2004/0243754 A1 Dec. 2, 2004

Related U.S. Application Data

(62) Division of application No. 09/825,927, filed on Apr. 5, 2001, now Pat. No. 6,779,066.

(30) Foreign Application Priority Data

May 1, 2000 (JP) ............................. 2000-132644

(51) Int. Cl.
*G06F 13/00* (2006.01)
(52) U.S. Cl. ........................ 710/301; 710/66; 710/72
(58) Field of Classification Search ................ 710/301, 710/66, 72
See application file for complete search history.

(56) References Cited

U.S. PATENT DOCUMENTS

| 4,377,853 | A |   | 3/1983  | Dockal        |         |
|-----------|---|---|---------|---------------|---------|
| 4,815,034 | A | * | 3/1989  | Mackey        | 710/64  |
| 5,518,325 | A | * | 5/1996  | Kahle         | 400/70  |
| 5,528,248 | A | * | 6/1996  | Steiner et al.| 342/357.06 |
| 5,574,859 | A |   | 11/1996 | Yeh           |         |
| 5,579,489 | A |   | 11/1996 | Dornier et al.|         |
| 5,608,840 | A |   | 3/1997  | Tsuboka       |         |
| 5,692,199 | A |   | 11/1997 | Kikinis et al.|         |
| 5,699,244 | A |   | 12/1997 | Clark et al.  |         |
| 5,712,763 | A |   | 1/1998  | Bullister     |         |
| 5,731,788 | A |   | 3/1998  | Reeds         |         |
| 5,835,732 | A | * | 11/1998 | Kikinis et al.| 710/303 |
| 5,953,511 | A |   | 9/1999  | Sescila et al.|         |
| 6,101,562 | A |   | 8/2000  | Chang et al.  |         |
| 6,222,726 | B1|   | 4/2001  | Cha           |         |
| 6,266,612 | B1| * | 7/2001  | Dussell et al.| 701/207 |
| 6,417,691 | B1|   | 7/2002  | Goodman et al.|         |
| 6,430,646 | B1|   | 8/2002  | Thusoo et al. |         |
| 6,442,637 | B1|   | 8/2002  | Hawkins et al.|         |
| 6,477,609 | B1|   | 11/2002 | Reiss et al.  |         |
| 6,558,320 | B1|   | 5/2003  | Causey et al. |         |
| 6,571,308 | B1| * | 5/2003  | Reiss et al.  | 710/315 |
| 6,754,509 | B1| * | 6/2004  | Yu et al.     | 455/556.1 |

(Continued)

FOREIGN PATENT DOCUMENTS

| JP | 5-47158  | 2/1993 |
| JP | 10-63254 | 3/1998 |

*Primary Examiner*—John R. Cottingham
*Assistant Examiner*—Justin I. King
(74) *Attorney, Agent, or Firm*—Wenderoth, Lind & Ponack, L.L.P.

(57) ABSTRACT

Once attached to a slot of a personal digital assistant, a card module executes an application-specific program and transmits a result obtained thereby to the personal digital assistant. The thus received execution result is outputted from an output part. Accordingly, the output part can be provided for shared use among several card modules for output of the execution result.

6 Claims, 7 Drawing Sheets

U.S. PATENT DOCUMENTS 6,779,066 B1 * 8/2004 Sakamoto .................. 710/300
6,795,877 B1 * 9/2004 Glenn ........................ 710/36
6,810,444 B1 * 10/2004 Kimura ...................... 710/27
6,813,661 B1 * 11/2004 Li .............................. 710/62

* cited by examiner

DATA TERMINAL EQUIPMENT

This application is a divisional application of Ser. No. 09/825,927, filed Apr. 5, 2001 now U.S. Pat. No. 6,779,066.

BACKGROUND OF THE INVENTION

1. Field of the Invention

The present invention relates to modules and, more specifically, to a card module attachable to data terminal equipment, and once attached, executing an application-specific program stored therein, and transmitting its result to the data terminal equipment.

2. Description of the Background Art

Recently, portable devices are rapidly becoming popular, and a user plays games with his/her portable game machine, or listens to music with his/her portable audio player. There also has appeared a portable navigation device guiding a user which way to go, and indicating where he/she currently is.

The problem here is, such conventional portable devices are each designed for a single application, and therefore the user has to purchase each different portable device for his/her varying purposes.

SUMMARY OF THE INVENTION

Therefore, an object of the present invention is to provide a card module of a type attached to data terminal equipment to deal with a user's varying purposes at low cost.

An aspect of the present invention is directed to a module attachable to data terminal equipment, comprising: a first storage for storing an application-specific program; a first processing unit for executing the program stored in the first storage; a first bus through which an execution result from the first processing unit is transferred; and a first communications controller for transmitting to the data terminal equipment the execution result transferred through the first bus. The data terminal equipment then outputs the execution result transmitted from the first communications controller from an internal output part.

As described above, in the aspect, the module stores and executes an application-specific program, and a result executed thereby is outputted from the data terminal equipment. Therefore, depending on what application the module is specifically for, a single data terminal equipment can be of various types. For example, if a user wants to listen to music, the data terminal equipment will be an audio player. As such, according to the aspect, a single data terminal equipment together with several modules each having a different program stored therein can deal with the user's varying purposes. Therefore, the user no longer needs to spend money to buy as many devices as functions to do with whatever he/she wants. Further, according to the aspect, since the module executes such application-specific programs, components of the module can be always optimally selected.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
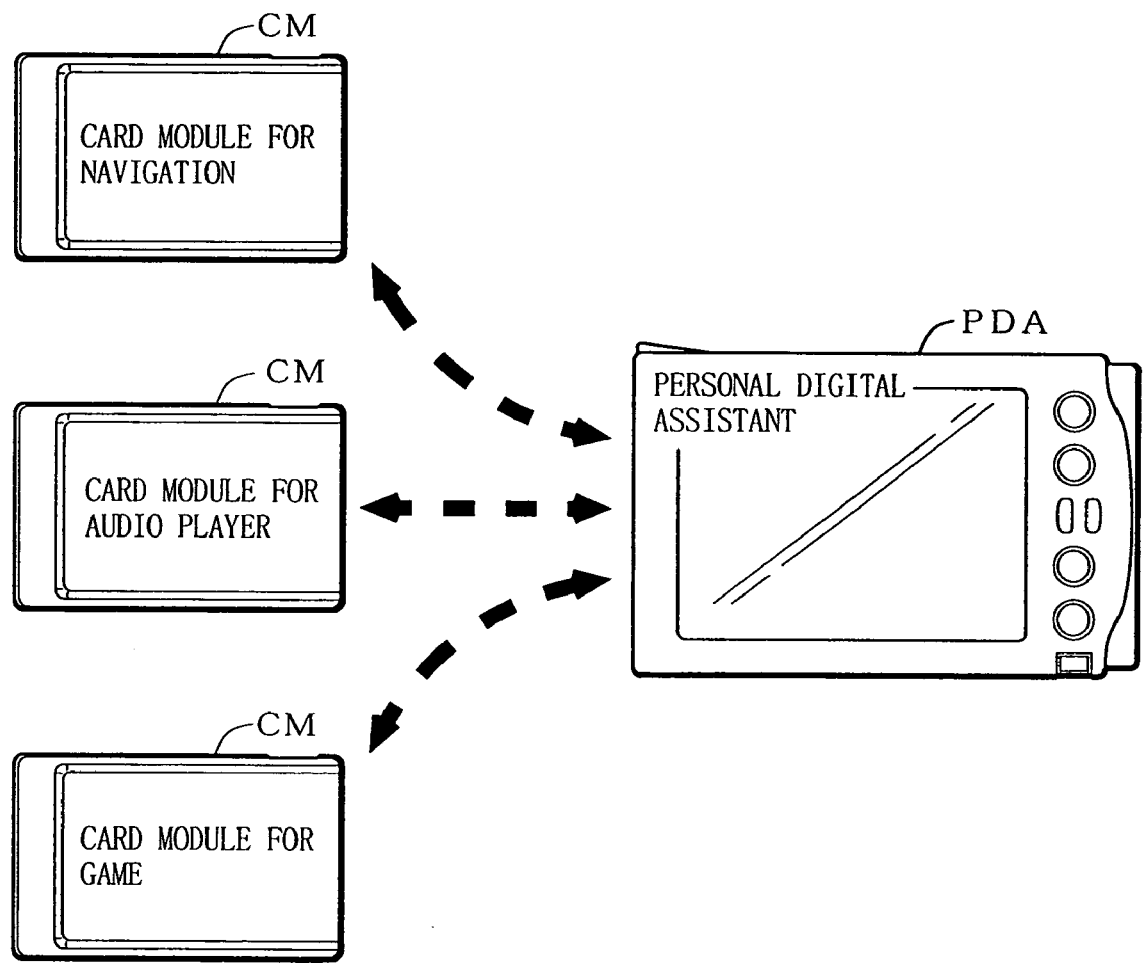
FIG. 1 shows front views of card modules CMs and a personal digital assistant PDA according to an embodiment of the present invention.
Figure 2A:
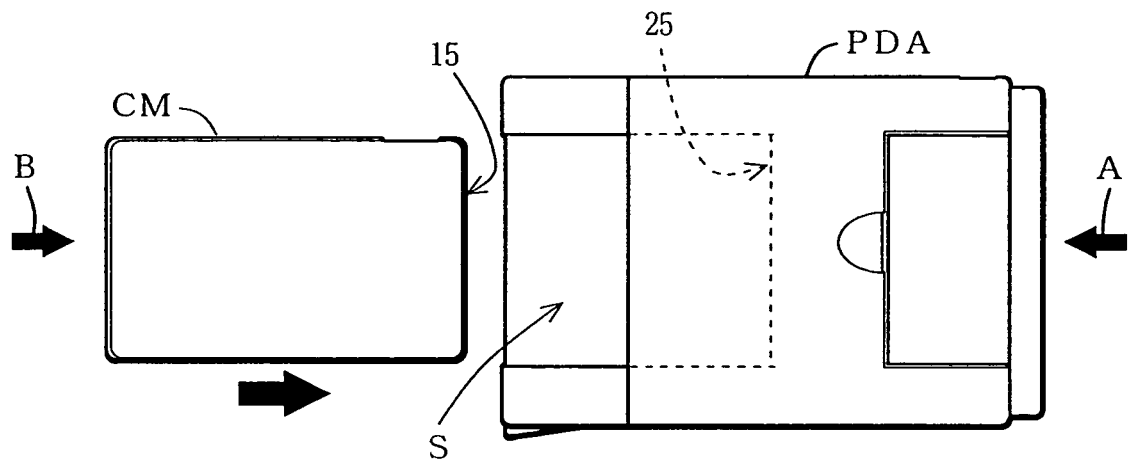
FIGS. 2A and 2B each show rear views of the card module CM and the personal digital assistant PDA of FIG. 1.
Figure 2B:
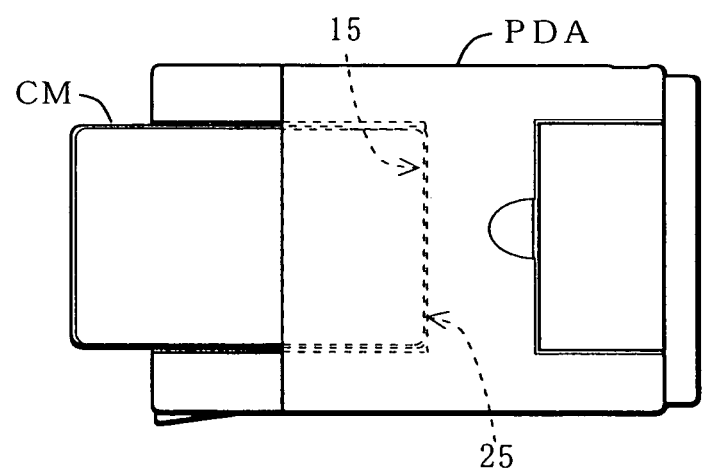

FIG. 1 shows front views of card-shaped modules CMs and a personal digital assistant PDA according to an embodiment of the present invention, while FIGS. 2A and 2B show back views thereof. The card module CM includes a printed circuit board (not shown) having a connector 15 equipped thereto for connection with the personal digital assistant PDA.

Figure 3A:
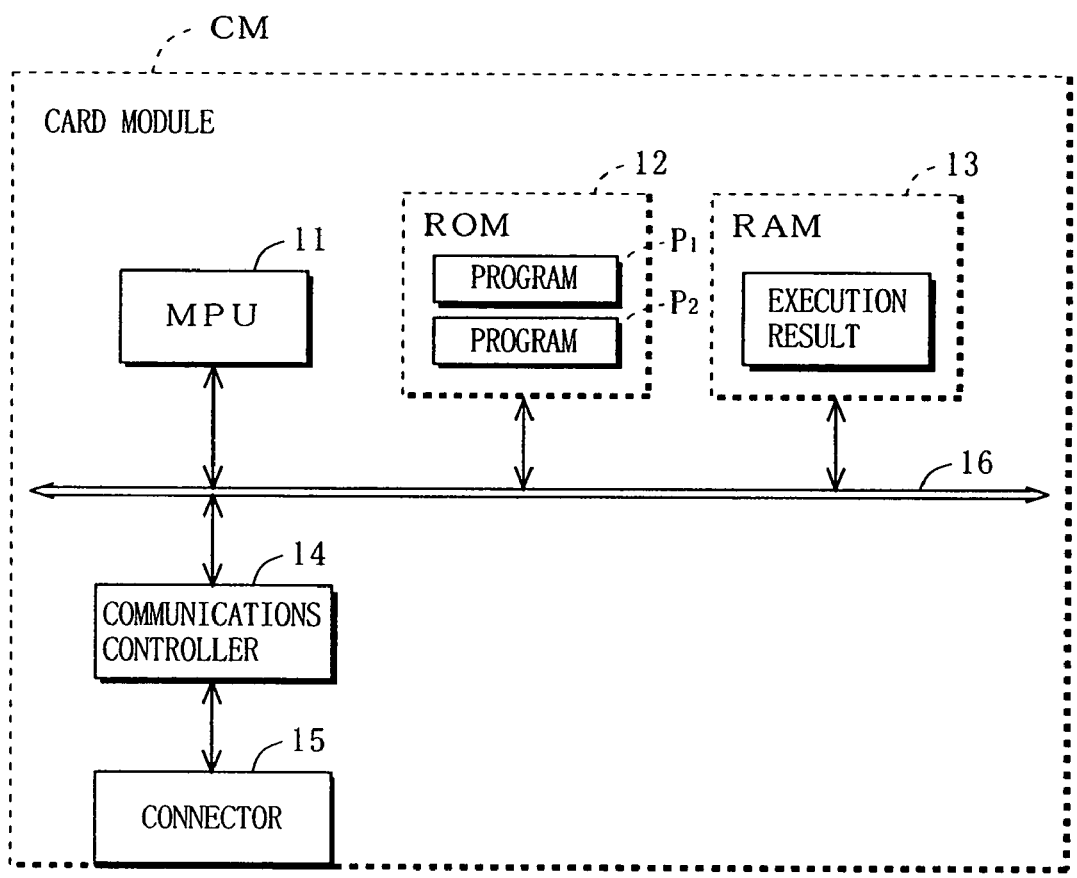
FIG. 3A is a block diagram showing the basic hardware structure of the card module CM of FIG. 1.

Such card module CM includes, as shown in FIG. 3A, an MPU (accelerator) 11, ROM 12, nonvolatile RAM 13, a communications controller 14, and a bus 16 together with the connector 15. The ROM 12 stores at least a program $P_1$ for connection establishment with the personal digital assistant PDA, and a predetermined program $P_2$. The predetermined program $P_2$ is written in each different program language, and realizes a single application with respect to every combination of the card module CM and the personal digital assistant PDA. Such predetermined program $P_2$ may be a program for an audio player, navigation program, game program, and the like. The MPU 11 executes the programs $P_1$ and $P_2$ while using the RAM 13 as a working area. The communications controller 14 transmits/receives control information and data to/from the personal digital assistant PDA, and also adjusts the number of bits (will be described later). The connector 15 is used for connection between the card module CM and the personal digital assistant PDA. The bus 16, which is a bundle of signal lines, interconnects the MPU 11, ROM 12, RAM 13, and communications controller 14 to one another. In this embodiment, among those signal lines, m signal lines are used for data transfer, and p for transmission/reception of the control information. Here, the number m of the signal lines (i.e., m-bit width) for data transfer can be 8, 16, 32, 64, 128, or 256.

As for such card module CM, specifications thereof are basically left to designers' discretion. More specifically, designers selectively combine the MPU 11, ROM 12, RAM 13, connector 15, and bus 16 in consideration of manufacturing cost and what application. Here, some applications may require other devices, for example, navigation with GPS specifically requires receiver and antenna. However, such device addition is not considered essential to the present invention, and thus is neither described nor shown.

Figure 3B:
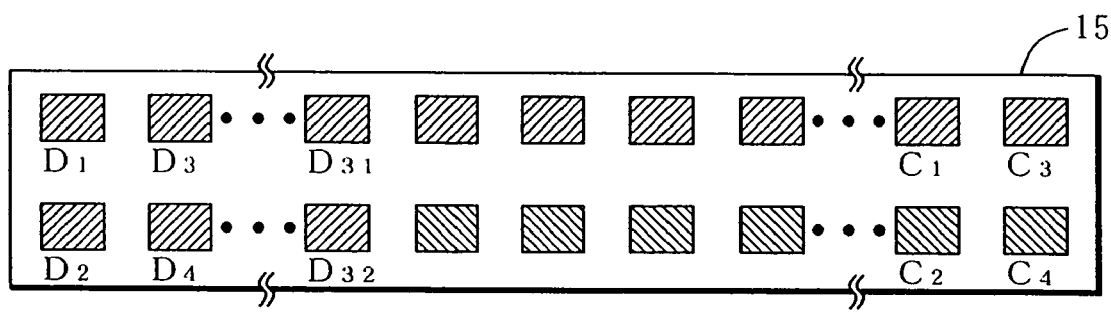
FIG. 3B is a schematic diagram showing a terminal arrangement of a connector 15 of FIG. 3A.

Referring to FIG. 3B, the connector 15 is now described in detail. FIG. 3B shows a terminal arrangement of the connector 15 viewed from an arrow A of FIG. 2A. In FIG.

3B, shaded square objects each denote a terminal, the total number of which is k. Here, the total number k is so determined as to be larger than the number m of the bit width, and k terminals are each coupled to the communications controller 14. Among those k terminals, p terminals are used as control terminals C. In the example of FIG. 3B, four terminals located at the right hand side are the control terminals $C_1$ to $C_4$. The rest of the terminals are possibly used as data terminals D, and the m-bit width determines in advance how many and which terminals are to be used. For example, when the bus 16 is of 32-bit width (i.e., m=32), 32 terminals $D_1$ to $D_{32}$ counted from the left hand side are used for data transfer.

As such, in principle, the specifications of the card module CM are changeable by designers. However, no matter what application, the outer shape of the card module CM needs to remain the same, and so does the physical shape of the connector 15.

Refer to FIGS. 1 to 2B again. The personal digital assistant PDA is exemplified by 3Com's PalmIIIx and IBM's WorkPad (both trademarks). As shown in FIG. 2A, the personal digital assistant PDA of this embodiment additionally includes a slot S, into which the card module CM is inserted. At the far end of the slot S, provided is a connector 25 having the same physical specifications as the connector 15.

Figure 4A:
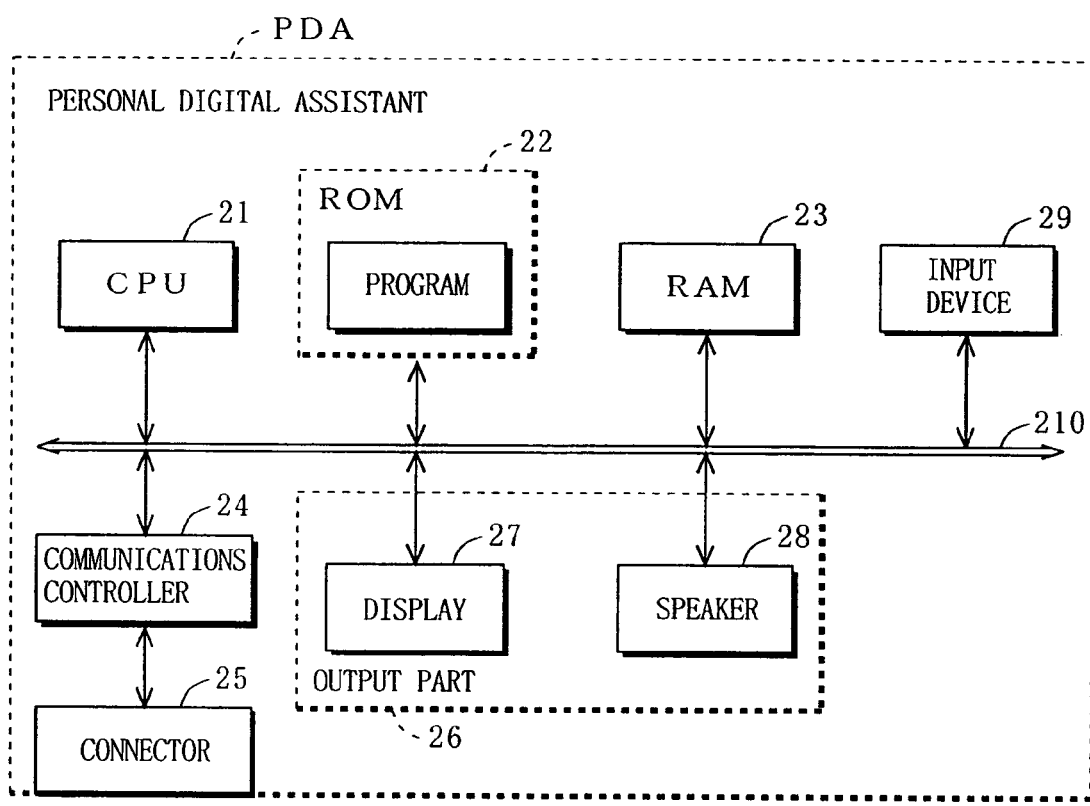
FIG. 4A is a schematic diagram showing the hardware structure of the personal digital assistant PDA of FIG. 1.

Such personal digital assistant PDA includes, as shown in FIG. 4A, a CPU 21, ROM 22, RAM 23, a communications controller 24, an output part 26, an input device 29, and a bus 210 together with the connector 25. The ROM 22 stores at least a program $P_3$ for connection establishment with the card module CM. The CPU 21 executes the program $P_3$ while using the RAM 23 as a working area. The communications controller 24 transmits/receives control information or data to/from the card module CM, and also adjusts the number of bits (will be described later). The connector 25 is used for connection between the personal digital assistant PDA and the card module CM. The output part 26 is typically composed of a display 27 and a speaker 28. The input device 29 is typically composed of a user-operable pen and touch sensor, and key. The bus 210, which is a bundle of signal lines, interconnects the CPU 21, ROM 22, RAM 23, communications controller 24, display 27, speaker 28, and input device 29 to one another. In this embodiment, among those signal lines, n signal lines are used for data transfer, and p for transmission/reception of the control information. Here, the number n of the signal lines (i.e., n-bit width) for data transfer can be 8, 16, 32, 64, 128, or 256. Accordingly, the bus 210 may be equal in bit width to the bus 16 on the card module CM side.

Figure 4B:
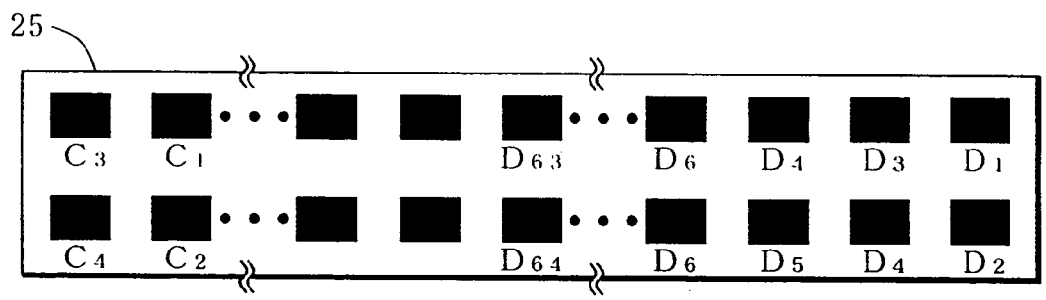
FIG. 4B is a schematic diagram showing a terminal arrangement of a connector 25 of FIG. 4A.

Referring to FIG. 4B, the connector 25 is now described in detail. FIG. 4B shows a terminal arrangement of the connector 25 viewed from an arrow B of FIG. 2A. Here, the physical specifications of the connector 25 are the same as those of the connector 15, and thus are not described in detail. In FIG. 4B, blackened square objects each denote a terminal, the total number of which is also k. Those k terminals are each coupled to the communications controller 24. Among from those k terminals, p terminals are used as the control terminals C. Herein, p signal lines of the bus 210 need to be all coupled to p signal lines of the bus 16. Thus, in this example, four terminals located at the left hand side are the control terminals $C_1$ to $C_4$. The rest of the terminals are possibly used as the data terminals D, and the n-bit width determines in advance how many and which terminals are to be used. For example, when the bus 210 is of 64-bit width (i.e., m=64), 64 terminals $D_1$ to $D_{64}$ counted from the right hand side are used for data transfer.

Figure 5:
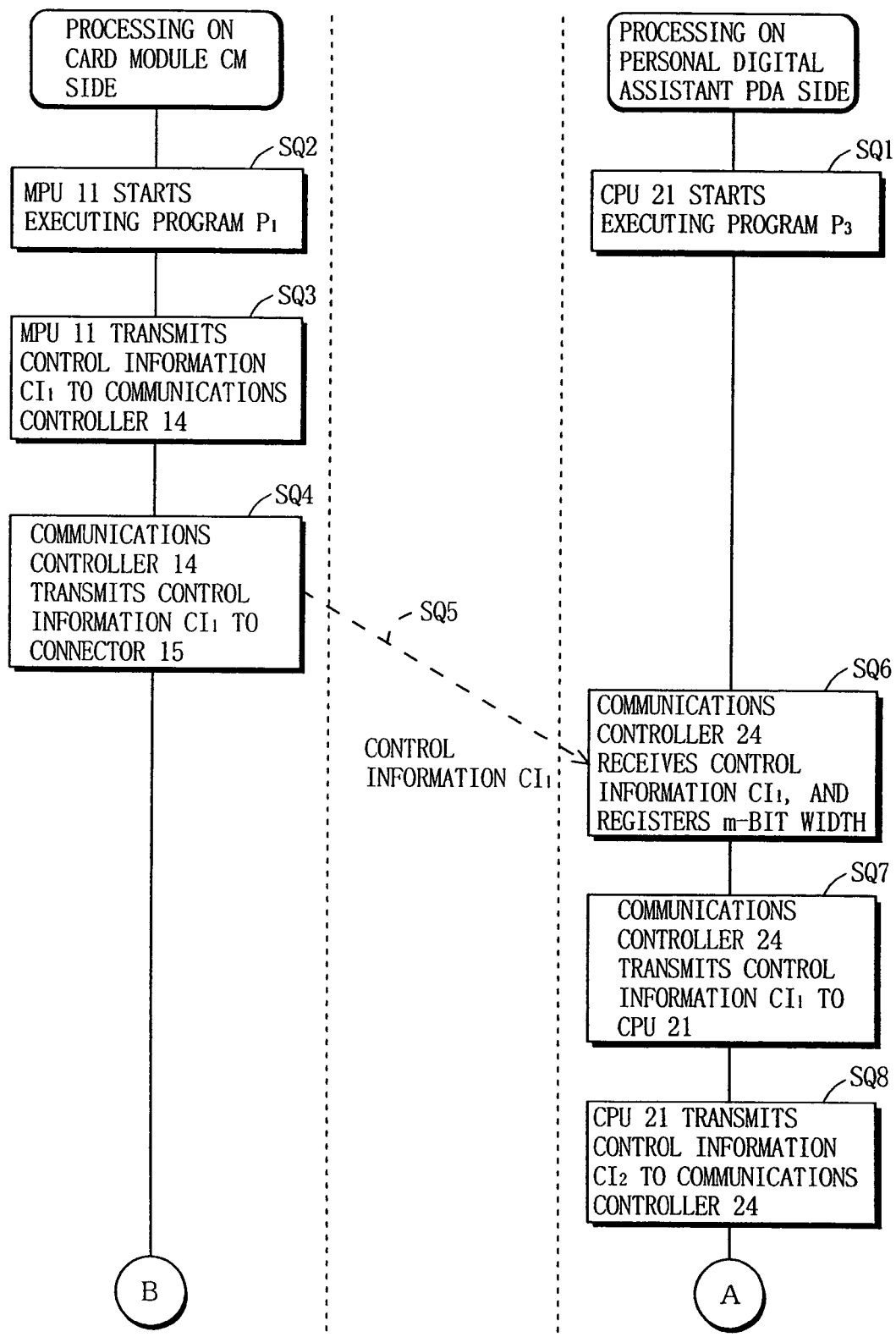
FIG. 5 is a sequence chart showing the first part of a communications procedure between a card module CM and a personal digital assistant PDA.
Figure 6:
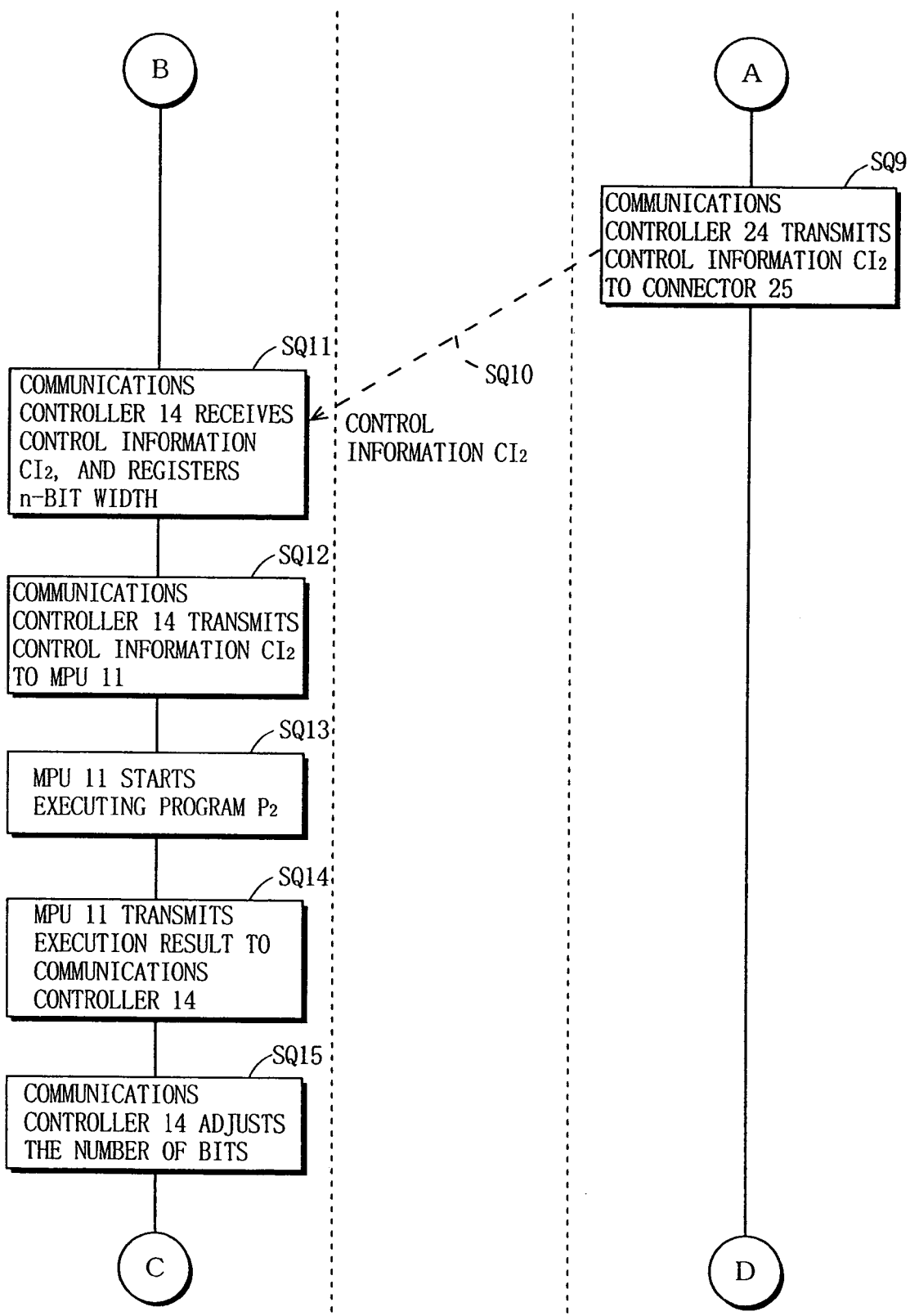
FIG. 6 is a sequence chart showing the second part of the communications procedure between the card module CM and the personal digital assistant PDA.
Figure 7:
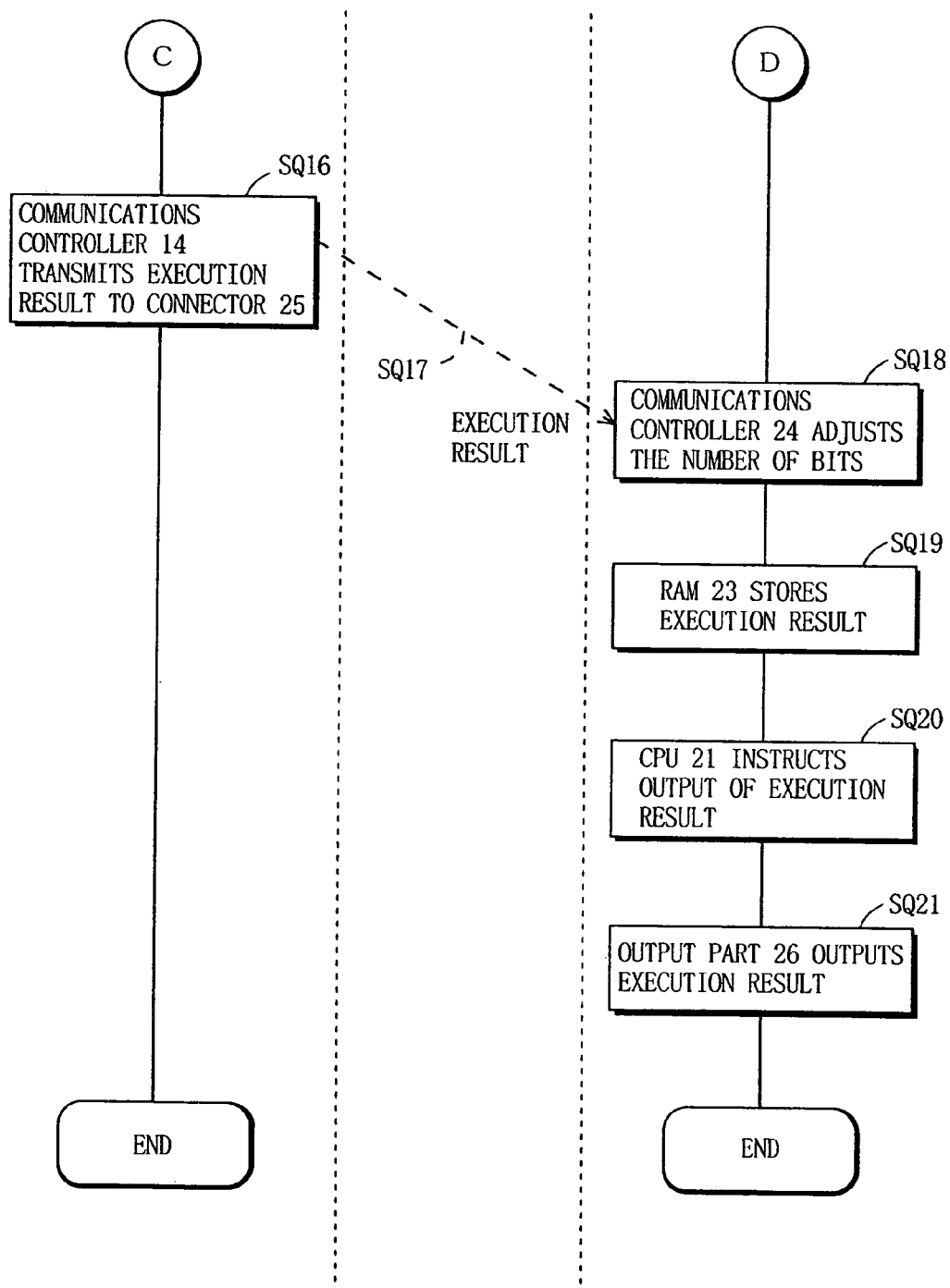
FIG. 7 is a sequence chart showing the last part of the communications procedure between the card module CM and the personal digital assistant PDA.

With reference to FIGS. 5 to 7, described next is an exemplary operation of such structured card module CM and personal digital assistant PDA. The user now inserts the card module CM into the slot S of the personal digital assistant PDA (see FIG. 2A). By pushing the card module CM farther (see FIG. 2B), the connectors 15 and 25 are connected via terminals, and the card module CM accordingly receives power supply voltage preferably from the personal digital assistant PDA. Here, the card module CM may receive power supply voltage from an internal battery.

In the personal digital assistant PDA, in recognition that the card module CM is connected to the connector 25, the CPU 21 starts executing the program $P_3$ (FIG. 5; sequence SQ1). Then, the CPU 21 waits for any control information from the card module CM side.

In the card module CM, the MPU 11 starts executing the program $P_1$ once provided with power supply voltage (sequence SQ2).

The MPU 11 then transmits control information $CI_1$ found in the program $P_1$ to the communications controller 14 through the signal lines, for control information, of the bus 16 (sequence SQ3). Here, the control information $CI_1$ is the one inquiring the personal digital assistant PDA about the n-bit width of the bus 210. Herein, the control information $CI_1$ includes information about the m-bit width of the bus 16 to notify the personal digital assistant PDA thereof. The control information $CI_1$ is then sent out from the communications controller 14 to the control terminals C of the connector 15 (sequence SQ4). In this manner, the control information $CI_1$ is provided to the control terminals C of the connector 25 of the personal digital assistant PDA (sequence SQ5).

In response to the control information $CI_1$ via the control terminals C of the connector 25, the communications controller 24 of the personal digital assistant PDA extracts the number m of the bit width therefrom. The communications controller 24 then registers the thus extracted number m into an internal storage (not shown) typified by a register, for example (sequence SQ6). Then, the communications controller 24 transmits the received control information $CI_1$ to the CPU 21 through the signal lines, for control information, of the bus 210 (sequence SQ7). In response thereto, the CPU 21 transmits control information $CI_2$ found in the program $P_3$ to the communications controller 24 through the signal lines, for control information, of the bus 210 (sequence SQ8). Herein, the control information $CI_2$ includes information about the n-bit width of the bus 210 to notify the personal digital assistant PDA thereof. After transmitting the control information $CI_2$, the CPU 21 stops executing the program $P_3$, and waits for any control information this time from the card module CM side. The communications controller 24 then sends out the received control information $CI_2$ towards the control terminals C of the connector 25 (FIG. 6; sequence SQ9). In this manner, the control information $CI_2$ is provided to the control terminals C of the connector 15 of the card module CM (sequence SQ10).

In response to the control information $CI_2$ via the control terminals C of the connector 15, the communications controller 14 of the card module CM extracts the number n of the bit width therefrom. The communications controller 14 then registers the thus extracted number n into an internal storage (not shown) typified by a register, for example (sequence SQ11). Then, the communications controller 14 transmits the received control information $CI_2$ to the MPU 11 through the signal lines, for control information, of the bus 16 (sequence SQ12). With the control information CI$_2$, the MPU 11 understands that connection between the card module CM and the personal digital assistant PDA is now established, and then stops executing the program P$_1$ and starts executing the program P$_2$ (sequence SQ13). The execution result of the program P$_2$ is stored in the RAM 13. Here, the execution result is video data, image data, audio data, character data, or a combination of two or more of such data.

In the case that the MPU 11 wants the execution result of the program P$_2$ outputted from the output part 26 of the personal digital assistant PDA, the execution result in the RAM 13 is transmitted, by m bits, to the communications controller 14 through m signal lines, for data transfer, of the bus 210 (sequence SQ14). That is, the execution result is transferred, in parallel, to the communications controller 14 by m bits. When the execution result starts being received by m bits, the communications controller 14 starts adjusting the number of bits (sequence SQ15). To be specific, the communications controller 14 first compares between the n-bit width registered in the above sequence SQ11 and the m-bit width. When m>n, the communications controller 14 divides the execution result came by m bits into n bits, and then stores the result in an internal FIFO (First In First Out). The communications controller 14 repeats such division and storage until the execution result is completely through. The thus stored execution result is then sent out from the FIFO, in parallel by n bits, to n data terminals D$_1$ to D$_n$ of the connector 15.

When m>n is not satisfied, the communications controller 14 stores, in the FIFO, the execution result being received by m bits without any process. The communications controller 14 repeats such storage until the execution result is completely through. The thus stored execution result is then sent out from the FIFO, in parallel by m bits, to m data terminals D1 to D$_m$ of the connector 15 (FIG. 7; sequence SQ16).

The execution result is thus, by n or m bits, provided to the data terminals D$_1$ to D$_n$ or D$_m$ of the connector 25 of the personal digital assistant PDA (sequence SQ17). When the execution result starts being received via those data terminals D$_1$ to D$_n$ or D$_m$, the communications controller 24 of the personal digital assistant PDA starts adjusting the number of bits (sequence SQ18). To be specific, the communications controller 24 compares between the m-bit width registered in the above sequence SQ6 and the n-bit width.

When m>n, the communications controller 24 receives the execution result which has been adjusted for n-bit width of the bus 210. The communications controller 24 thus transfers the received execution result to the RAM 23 as it is. The communications controller 24 repeats such transfer until every execution result is completely through. On the other hand, when m>n is not satisfied, the communications controller 24 receives the execution result which has not been adjusted for n-bit width of the bus 210. Therefore, the execution result each transmitted by m bits is padded with a dummy word of (n–m) bits before transferred to the RAM 23. The communications controller 24 repeats such padding and transfer until the execution result is completely through. With such padding, the RAM 23 stores the execution result by n bits (sequence SQ19).

When the execution result is completely stored by n bits in the RAM 23, the CPU 21 instructs the output part 26 to output the execution result (sequence SQ20). Note herein that, if the execution result has dummy words padded thereto, the CPU 21 takes those dummy words out after sequence SQ19, or when the execution result is completely stored in the RAM 23. The CPU 21 also controls transfer of the execution result from the RAM 23 to the output part 26. The output part 26 accordingly responds to the instruction from the CPU 21, and receives and outputs the execution result stored in the RAM 23 (sequence SQ21).

Here, during when the program P$_2$ is executed, the user may operate the input device 29. In such a case, the input device 29 generates input information for specifying the user's operation. The thus generated input information is processed by the CPU 21, and then transmitted to the card module CM side. The operation of the personal digital assistant PDA and the card module CM, respectively, is evident from the above, and thus is not described.

As such, the card module CM is so structured as to store and execute the application-specific program P$_2$, and its execution result is outputted from the output part 26 of the attached personal digital assistant PDA. Accordingly, if the user wants to listen to music, for example, he/she only need to attach an appropriate card module CM to his/her personal digital assistant PDA. This is always applicable no matter what the user wants with his/her personal digital assistant PDA.

As is obvious from the above, according to the present embodiment, the user's varying purposes can be met only with a single personal digital assistant PDA and several modules each having the application-specific program P$_2$ stored therein. Therefore, to do with whatever the user wants, he/she no longer needs to spend money to buy as many personal digital assistants PDAs.

Further, since the card module CM executes only application-specific programs P$_2$, components of the card module CM can be always optimally selected. Still further, there only needs for the personal digital assistant PDA to output the execution result, the specifications thereof thus do not have to be so rigid.

Here, in the above description, the card module CM is attached to the personal digital assistant PDA. This is not restrictive, and the card module CM may be attached to data terminal equipment typified by a personal computer and cellular phone.

While the invention has been described in detail, the foregoing description is in all aspects illustrative and not restrictive. It is understood that numerous other modifications and variations can be devised without departing from the scope of the invention.

What is claimed is:

1. Data terminal equipment to which a module is attachable, wherein
    the module comprises:
        a first storage operable to store an application-specific program;
        a first processing unit operable to execute the application-specific program stored in the first storage;
        a first bus operable to transfer an execution result from the first processing unit; and
        a first communications controller operable to inquire as to a bit width of a second bus in the data terminal equipment from the data terminal equipment, register the bit width of the second bus returned from the data terminal equipment, adjust a number of bits of the execution result transferred from the first bus based on the registered bit width of the second bus, and transmit the execution result with the adjusted number of bits to the data terminal equipment, the data terminal equipment comprises:
- a connector for disconnectably connecting to the module; and
- a second communications controller operable to receive the execution result transmitted from the first communications controller, and the data terminal equipment is operable to output, from an integral output part, the execution result provided by the first communications controller.

2. The data terminal equipment according to claim 1, wherein the data terminal equipment is a personal digital assistant, a personal computer, or a portable phone.

3. A game machine to which a module is attachable, the module comprising:
- a first storage operable to store a game program;
- a first processing unit operable to execute the game program stored in the first storage;
- a first bus operable to transfer an execution result from the first processing unit; and
- a first communications controller operable to inquire as to a bit width of a second bus in the game machine from the game machine, register the bit width of the second bus returned from the game machine, adjust a number of bits of the execution result transferred from the first bus based on the registered bit width of the second bus, and transmit the execution result with the adjusted number of bits to the game machine, wherein the game machine is operable to output, from an integral output part, the execution result provided by the first communications controller.

4. A navigation device to which a module is attachable, the module comprising:
- a first storage operable to store a navigation program;
- a first processing unit operable to execute the navigation program stored in the first storage;
- a first bus operable to transfer an execution result from the first processing unit; and
- a first communications controller operable to inquire as to a bit width of a second bus in the navigation device from the navigation device, register the bit width of the second bus returned from the navigation device, adjust a number of bits of the execution result transferred from the first bus based on the registered bit width of the second bus, and transmit the execution result with the adjusted number of bits to the navigation device, wherein the navigation device is operable to output, from an integral output part, the execution result provided by the first communications controller.

5. An audio player to which a module is attachable, the module comprising:
- a first storage operable to store a program for playing audio;
- a first processing unit operable to execute the program stored in the first storage;
- a first bus operable to transfer an execution result from the first processing unit; and
- a first communications controller operable to inquire as to a bit width of a second bus in the audio player from the audio player, register the bit width of the second bus returned from the audio player, adjust a number of bits of the execution result transferred from the first bus based on the registered bit width of the second bus, and transmit the execution result with the adjusted number of bits to the audio player, wherein the audio player is operable to output, from an integral output part, the execution result provided by the first communications controller.

6. Data terminal equipment to which a module is attachable, wherein the module is operable to execute an application-specific program stored therein, inquire as to a bit width of a bus of the data terminal equipment, adjust a number of bits of an execution result thereby to a predetermined number, and transmit the execution result with the adjusted number of bits to the data terminal equipment, the data terminal equipment comprising:
- a reception part operable to receive, from the module, control information and the execution result whose number of bits is adjusted by the module;
- the bus operable to transfer the execution result received by the reception part;
- a storage operable to store the execution result transferred via the bus;
- an integral output part; and
- a processing part operable to receive the control information from the reception part, send a bit width of the bus to the module, and instruct the integral output part to output the execution result stored in the storage, and wherein the reception part is operable to receive the execution result after sending the bit width of the bus in the data terminal equipment to the module, the integral output part is operable to output the execution result in accordance with the processing part, and the predetermined number is the bit width of the bus.

* * * * *

UNITED STATES PATENT AND TRADEMARK OFFICE
CERTIFICATE OF CORRECTION

| | |
|---|---|
| PATENT NO. | : 7,058,745 B2 |
| APPLICATION NO. | : 10/885736 |
| DATED | : June 6, 2006 |
| INVENTOR(S) | : Kiyomi Sakamoto |

Page 1 of 1

It is certified that error appears in the above-identified patent and that said Letters Patent is hereby corrected as shown below:

On the Cover Page

In Section (56) References Cited, under the "U.S. PATENT DOCUMENTS" heading, please correct the following reference:

6,754,509 B1        6/2004        <u>Khan</u> et al.

Signed and Sealed this

Twenty-eighth Day of November, 2006

JON W. DUDAS
*Director of the United States Patent and Trademark Office*